INVENTOR
HIDEO MATSUSHITA
ATTORNEY

INVENTOR
HIDEO MATSUSHITA

BY

ATTORNEY

United States Patent Office 3,430,965
Patented Mar. 4, 1969

3,430,965
PHONOGRAPH PICKUP ARM
Hideo Matsushita, 34, 3-chome, Nishihara,
Shibuya-ku, Tokyo, Japan
Filed Jan. 27, 1967, Ser. No. 612,123
Claims priority, application Japan, Jan. 29, 1966,
41/5,044
U.S. Cl. 274—23            8 Claims
Int. Cl. G11b 3/12

ABSTRACT OF THE DISCLOSURE

The invention is concerned with a multisection pickup arm, the individual sections of which are so dimensioned and interconnected that the stylus operatively connected to a free end portion of one of the sections moves in a straight line path, when riding within the spiral grooves of a rotating record disk, from the outer peripheral portion of the spiral grooves toward the center part thereof.

---

This invention relates to a pickup arm and more particularly to a pickup arm constructed to faithfully reproduce sound recorded on record disks provided with spiral sound grooves.

The pickup arm to accomplish the foregoing purpose is preferably constructed in such manner that the stylus moves along a straight line path while travelling from the outer periphery of the record disk toward the center thereof.

Pickup arms of the offset type are conventional and consist of an integral arm of predetermined length having one end pivoted about a fixed center and whose opposite free end is provided with a stylus. Such conventional pickup arms, when the stylus carried thereby moves from the outer periphery of the grooves on the record disk toward the center thereof moves in an arcuate path and, accordingly, the position of the stylus relative to the tangential direction of the sound grooves is acceptable within only a limited range of movement of the stylus.

The present invention is extended to overcome the foregoing disadvantage and provides a pickup whose stylus is maintained in a position which is consistent with the tangential direction of the sound grooves thereby eliminating undesirable sound distortions resulting from tracking error.

The invention further provides a pickup which eliminates undesirable force components which cause the stylus to shift toward the center of the record disk, thereby eliminating lateral bias pressure against the sound grooves to permit sound reproduction of excellent fidelity, without damaging either the sound grooves or stylus.

The invention is intended further to provide a pickup arm of low weight to minimize the mass of inertia, thereby enabling the stylus to track the sound grooves faithfully with low stylus pressure.

With the foregoing in mind it is one of the objects of the invention to provide a pickup capable of reproducing sound from a record disk with extremely high fidelity.

Another object of the invention is to provide a pickup arm the location of attachment of which is not restricted and which location preferably is spaced from the record disk, thereby greatly facilitating the assembly and disassembly of the transducer system used in association with the arm.

A yet further object of the invention is to provide a pickup whose arm may be collapsed and shortened in folded form so as to reduce the space it occupies to facilitate its encasement and transport.

A still further object of the invention is to provide a pickup arm which is simple in construction and easy to assemble, and which may be manufactured at low cost.

In one embodiment of the present invention there is provided a pickup arm which has two links, each of which is provided with, for example, a pair of pulleys connected by a suitable connecting means so as to be in interlocking relation, each of said pulleys constituting a turning pair with the associated link, said two links being further connected with each other in such a manner that one link is rigidly fixed to one of the pulleys associated with the other link, while the latter is similarly fixed to one of the pulleys associated with said one link, such pulleys fixed to the links being concentrically arranged. Further, according to the present invention, the diameters of the interlocking paired pulleys is advantageously set at a ratio 2 to 1. While the pulleys of a pair must have the diameters of 2:1, pulleys of one pair may have diameters different from those of pulleys of the other pair.

A pair of pulleys are provided on each of the two links with the centers of pulleys of each pair being equally spaced apart, such distance defining the effective length of the link.

The diameter or diameters of the two concentrically arranged pulleys is smaller than that or those of the other of the corresponding pairs. The larger pulley associated wth one link is preferably fixed to a mounting base while the larger pulley associated with the other link preferably supports a lever or frame to which a cartridge is to be attached.

In accordance with the invention, the free end of the pickup arm moves along a straight line path passing through the fixed center, that is, the point of attachment of the arm. The free end of the arm may move in the straight line path to one side of the fixed center or it may be arranged to pass under or over the fixed center to the opposite side, the free end however always moving in a straight line path. The cartridge attached to the larger pulley associated with the other link, as above mentioned, or the stylus carried thereby, will then move in a straight line path. It should be noted that this larger pulley, lying substantially at the free end of the arm, is caused to rotate while the free end of the arm moves in the straight line path. Such rotation of the larger pulley serves to prevent a change in the orientation of the cartridge or stylus with respect to sound grooves when the stylus moves towards the center of the record disk along the above-mentioned straight line.

Obviously the pulleys above referred to may be replaced by either toothed wheels or friction wheels. The replacement wheels, forming a pair, may be connected through an odd number of toothed or friction wheels operatively interposed therebetween.

Above and other objects, features and advantages of the invention will be apparent from the following description with reference to the embodiments thereof illustrated in the drawing wherein.

Figure 1:
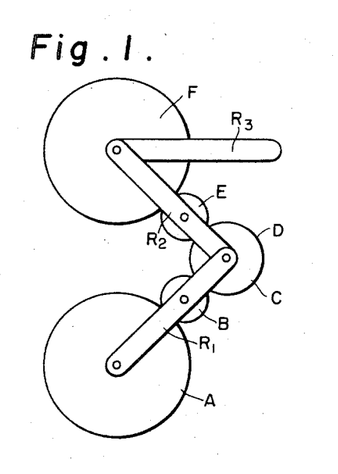
FIG. 1 is a schematic view of the pickup which uses a wheel train, illustrating the principle of the invention.
Figure 2:
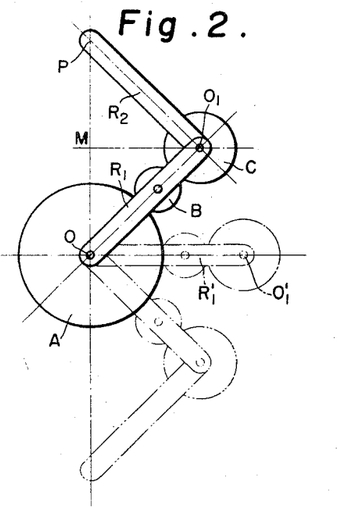
FIG. 2 is a partial view of the embodiment shown in FIG. 1, showing a pair of links and associated wheels.
Figure 3:
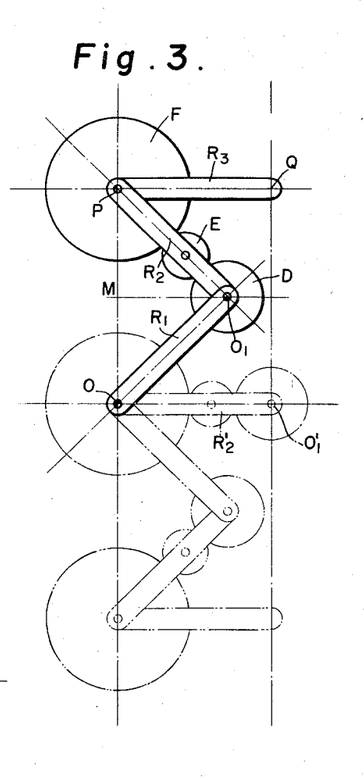
FIG. 3 is an other partial view of the embodiment of FIG. 1, illustrating that the lever attached to the free end of the arm moves, at its free end, along an imaginary straight line parallel to the locus of the free end of the arm.

Referring first to FIGS. 1 to 3 inclusively, the principle of the present invention may be conveniently represented by a mechanism consisting of two toothed wheel trains. A, B and C, and D, E and F.

The two wheels trains are coupled by fixing the link $R_1$ to the toothed wheel D so that the link $R_1$ forms a turning pair with the link $R_2$, and by fixing the link $R_2$ to the toothed wheel C so that the link $R_2$ constitutes a turning pair with the link $R_1$. A lever $R_3$ is attached to the toothed wheel F for ease of illustration that the toothed wheel F moves along an imaginary straight line without changing its direction.

The mechanism shown in FIG. 2 corresponds to the first of the two trains illustrated in FIG. 1. Three spur gears A, B and C mesh with each other in turn and constitute a turning pair with the link $R_1$. The link $R_2$ is affixed to the toothed wheel C. When the toothed wheel A is provided with twice as many teeth as the toothed wheel C and is fixed, turning the link $R_1$ about the fixed center O causes the end P of the link $R_2$ to move along a line OP perpendicular to the line $\overline{OO_1'}$, where the point $O_1'$ represents the position of the center of the toothed wheel C at the start of the turning of the link $R_1$. This is easily proved from the fact that the toothed wheel C should rotate twice as much as the toothed wheel A so that $$\angle OO_1P = 2\angle O_1'OO_1$$

The two links $R_1$ and $R_2$ have an equal effective length in accordance with the invention, so that $$\overline{OO_1} = \overline{OO_1'} = \overline{O_1P}$$

This means that $\triangle OO_1P$ is an equilateral triangle. Therefore, if a perpendicular is drawn from the point $O_1$ to the line OP, the intersection being denoted by M, it follows from the geometry that $$\angle O_1'OO_1 + \angle O_1OM = \angle MO_1O + \angle O_1OM = 90°$$

Thus the point P always moves on a straight line which is perpendicular to the line $\overline{OO_1'}$. Likewise, the point P moves on the above line when the link $R_1$ is reversely turned.

It will be evident that when the point P is utilized as the free end of the pickup arm, it moves on a straight line. However, a cartridge cannot be attached to such free end to practical purpose, because then the stylus will change its orientation with the movement of the cartridge.

FIG. 3 shows the second of the two trains illustrated in FIG. 1 and a lever, the free end of which moves along a straight line parallel to the locus of the free end of the arm without changing its direction.

Three spur gears D, E and F mesh with each other in turn and each of them forms a turning pair with the link $R_2$. A lever $R_3$ is fixed to the toothed wheel F. The toothed wheel F has twice as many teeth as the toothed wheel D, the toothed wheel D being fixed to one end the link $R_1$. When the end P of the link $R_2$ is made to move along a straight line OP perpendicular to the line $\overline{OO_1'}$, the end Q of the lever $R_3$ moves along a straight line parallel to the line OP. Such relationship can be proved in the similar manner as described with reference to FIG. 2. Likewise, the point Q moves on the above straight line parallel to the line OP even when the end P of the link $R_2$ is moved to the opposite side of the fixed center O.

Figure 4:
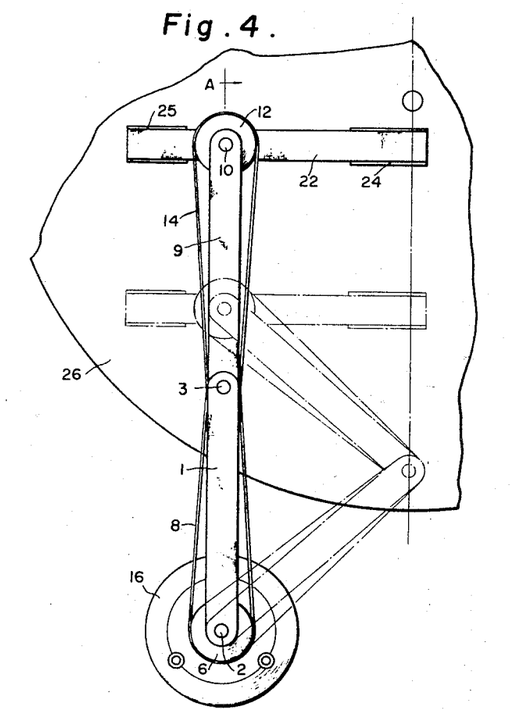
FIG. 4 is a plan view of a pickup, which employs pulleys and wrapping connectors, constructed according to the principle of the invention shown in FIG. 1, illustrating that the stylus of the cartridge attached to the free end of the lever moves along an imaginary straight line passing through the center of the turntable.
Figure 5:
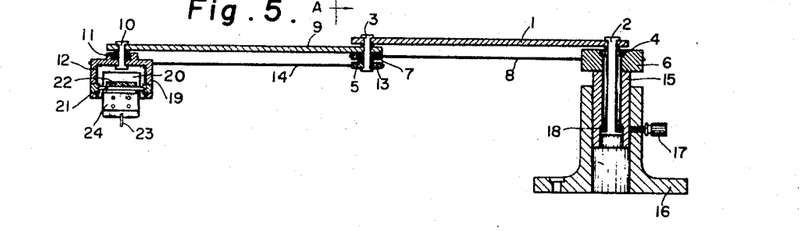
FIG. 5 is a vertical section taken along the line A—A of FIG. 4.

Thus it will be appreciated that the movement of the end Q of the lever $R_3$, fixed to the toothed wheel F, invariably or a straight line parallel to the line $\overline{OP}$ means that the toothed wheel does not change its direction, during its movement, and that a stylus can be made to move along a straight line leading to the center of the recorded disk without changing its direction when a cartridge is attached to the toothed wheel F or to a lever or a frame fixed to the toothed wheel, FIGS. 4 and 5 show a typical system based on the principle of the present invention as described above, but which uses pulleys instead of toothed wheels.

With reference to this system, the link 1 is provided, adjacent to both ends thereof, with a pivot 2 and a coupling shaft 3, the pivot and shaft being equipped with a pair of pulleys 6 and 7, respectively, in which are arranged bearings 4 and 5. The pair of pulleys 6 and 7 have a diameter ratio of 2 to 1 and are wrapped around by means of a narrow belt 8 so as to form an interlocking relation. One end of the link 9 is affixed to the pulley 7 and the other end is provided with a pivot 10 which in turn is received in a bearing 11 provided in a pulley 12. Arranged on and fixed to the shaft 3 is a pulley 13 concentrically with the pulley 7. The pulleys 12 and 13 form a pair, have the diameters of the ratio of 2:1 and are wrapped around by a narrow belt 14 to be interlocked in motion.

The two links 1 and 9 are pivotally connected to each other by the arrangement such that the link 1 is fixed to the pulley 13 which forms a turning pair with the link 9, while the link 9 is fixed to the pulley 7 which forms a turning pair with the link 1, thus each link being fixed to one of pulleys of that pair which forms a turning pair with the other link.

The narrow belts 8 and 14 for the two pairs of pulleys should preferably be formed from a material, such as metal wire, having extremely little elasticity, and are to be fitted to the outer periphery of the pulleys in such a manner that they do not slip with respect to the pulleys. While it is desirable that the links should be composed of a light metal such as aluminum in order to reduce mass, they should be sufficiently rigid in order that resonance caused by the vibration of other parts may be prevented.

The pulley 6 is provided with a downwardly extending cylindrical support 15 which fits into a mount 16 upon which the transducer system is to be mounted. The support 15 may be adjusted in its orientation and height by a screw 17 provided in the mount 16 and which clamps the support in position. The pivot 2 is subject to radial thrust and bears the whole weight of the pickup arm. Therefore, it is made comparatively long so that it may extend well into the support 15 at its lower end and supported by another bearing 18 within the support.

The pulley 12 has a downwardly extending, cylindrical frame 19 formed integrally therewith. The frame 19 is provided with an opening 20 in a direction perpendicular to a line connecting the pivots 2 and 10.

A rotray shaft 21 extends across the opening 20 and parallel to the above line. A lever 22 fixed on the shaft 21 protrudes from the opening 20 and 22 is provided on its one end with a cartridge 24 containing a stylus 23, and on the other with a weight 24 which, with the rotary shaft 21 serving as a fulcrum, maintains balance and stylus pressure.

Figures 6, 7:
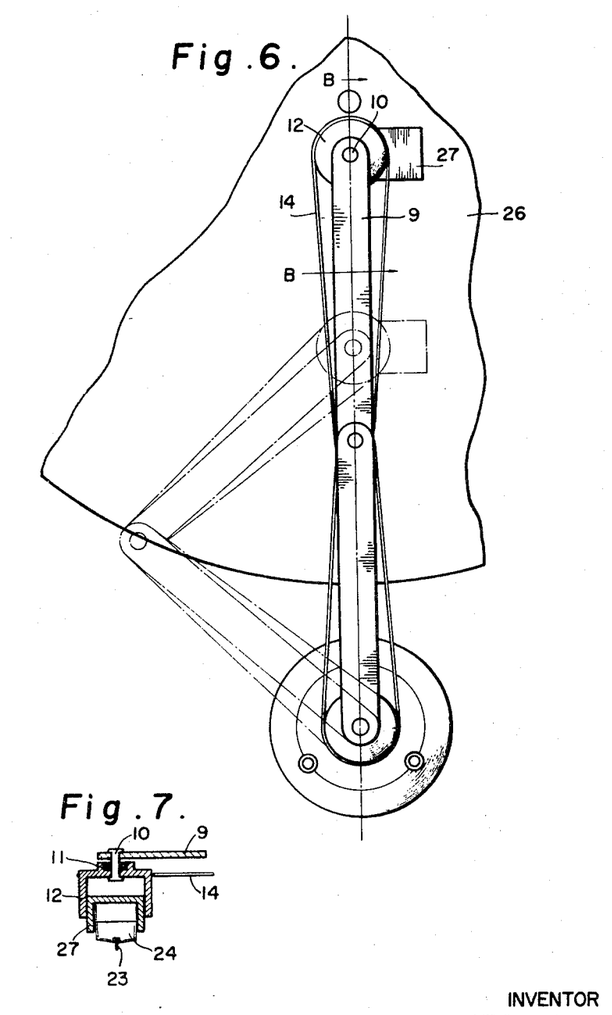
FIG. 6 is a plan view of a pickup similar to the embodiment shown in FIGS. 4 and 5 except that the stylus attached to the free end of the arm moves along an imaginary straight line joining the center of the turntable with the fixed center.
FIG. 7 is a vertical section taken along the line B—B of FIG. 6.

When installing the pickup, the mount 16 may be arranged outside the the turntable 26 and the support 15 should be oriented so that the stylus 23 moves on an imaginary straight line leading to the center of the turntable. The pickup shown in FIGS. 6 and 7 is similar in construction and action to the embodiment illustrated in FIGS. 4 and 5, the difference being that the cartridge 24 is directly attached to a special frame 27. The frame 27 incorporates an effective means for supporting the cartridge 24, with a suitable stylus pressure. While such means presents some difficulty better tracking performance of the stylus with regard to the sound grooves is achieved, since the mass may be reduced by elimination of a lever, and since friction may be reduced by removal of the rotary shaft.

Figure 8:
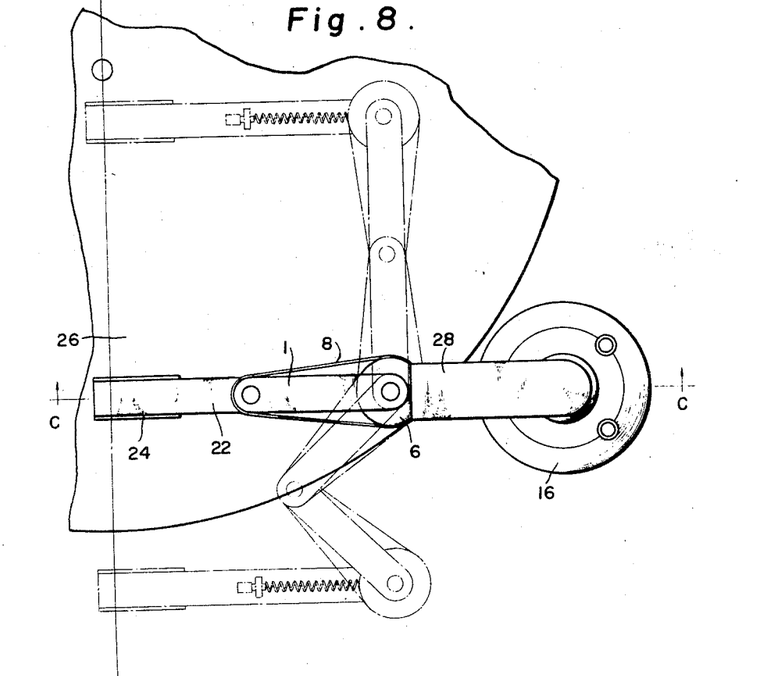
FIG. 8 is a plan view of a pickup so designed that the free end of the arm moves on an imaginary line passing through the fixed center on both sides thereof.
Figure 9:
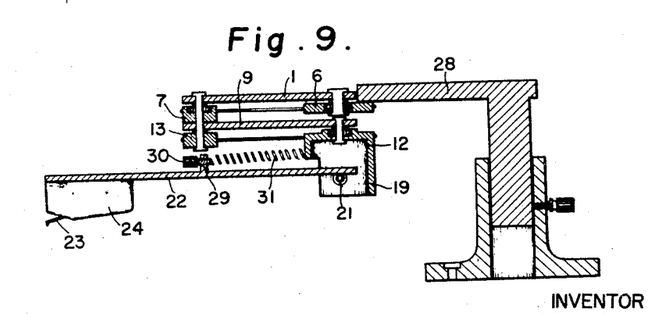
FIG. 9 is a vertical section taken along the line C—C of FIG. 8.

A slightly modified pickup is shown in FIGS. 8 and 9, which is designed to give the desired motion of the stylus with links of relatively short length, thereby effectively reducing the mass of the moving parts. In particular, it differs from the embodiment illustrated in FIGS. 4 and 5 in that the pulley 6 has an angle-shaped support 28 extending transversely therefrom, thereby providing a space below the pulley 6. In addition, the lever 22 is slightly longer, whereas the links 1 and 9 are comparatively short, the links and lever being adapted to be brought to a position in which they lie one above the other.

The unique feature of this pickup is that the pulley 12 can pass freely under the pulley 6, and that the stylus 23 moves both to the right and to the left of the mount 16 with the mount as the center. The lever 22 is provided with a spring 31 which extends from the screw 31 to the frame 19, the screw being supported by a protrusion 29 disposed halfway between the frame 19 and the cartridge 24. Needle pressure at the stylus 23 and balance are maintained by turning the screw 30 and thereby regulating the tension of the spring 31. The spring 31 is capable of insuring a sufficient lineality, since the mass to be balanced is small.

Figure 10:
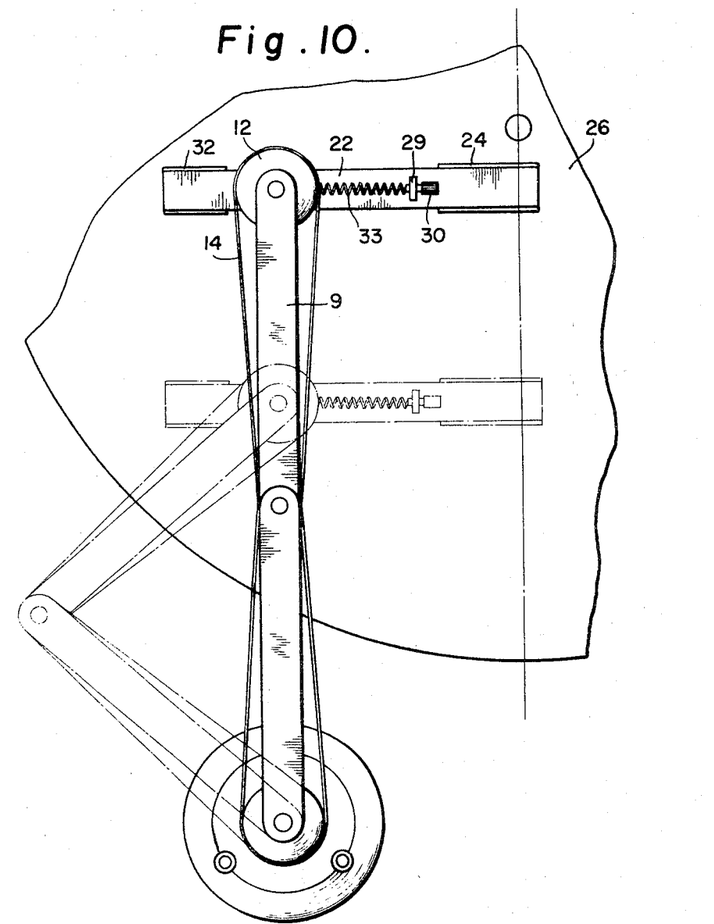
FIG. 10 is a plan view of a pickup similar to that shown in FIGS. 4 and 5 except that the lever is attached in the opposite direction.

FIG. 10 shows another pickup in plan view, which is similar to that shown in FIGS. 4 and 5 except the arrangement of the lever 22 and the manner of providing the stylus pressure. The lever 22 is so disposed that it occupies a position substantially 180 degrees ahead of that of the lever illustrated in FIGS. 4 and 5. Further, the weight 32 attached to the lever 22 has a comparatively low mass sufficiently for maintaining balance. In the present system, stylus pressure is imparted by spring 33 of small tension which is similar in construction to the spring 31 shown in FIGS. 8 and 9.

Figures 11, 17:
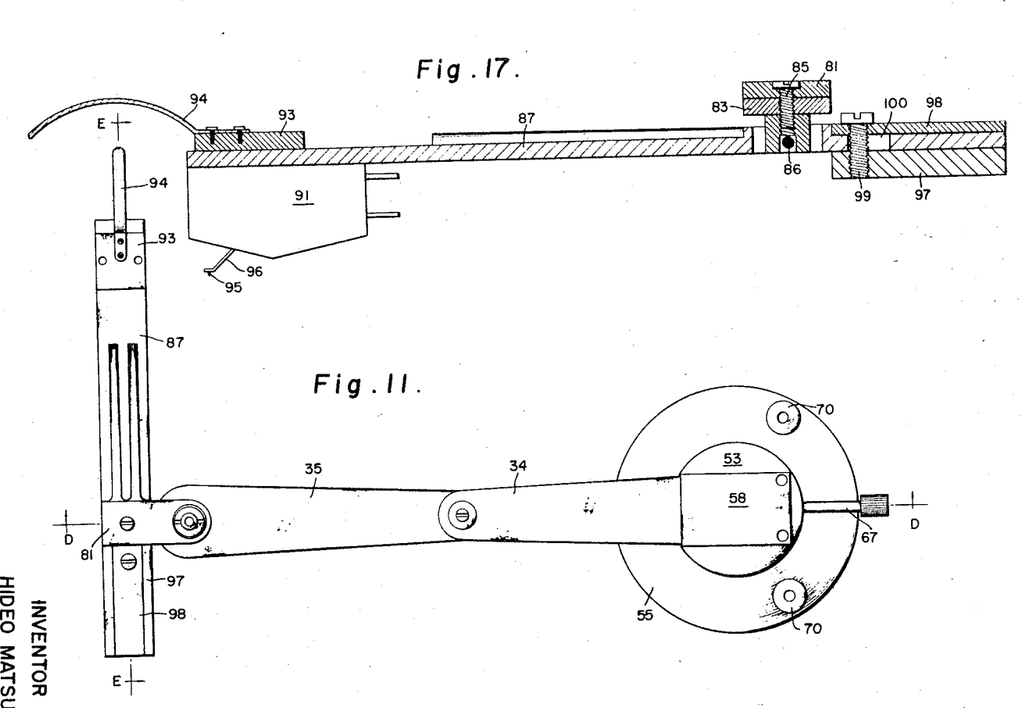
FIG. 11 is a plan view of one embodiment of the pickup utilizing the principle of the present invention.
FIG. 17 is an enlarged vertical section taken along the line E—E of FIG. 11 which shows the lever with the cartridge attached thereto.
Figure 12:
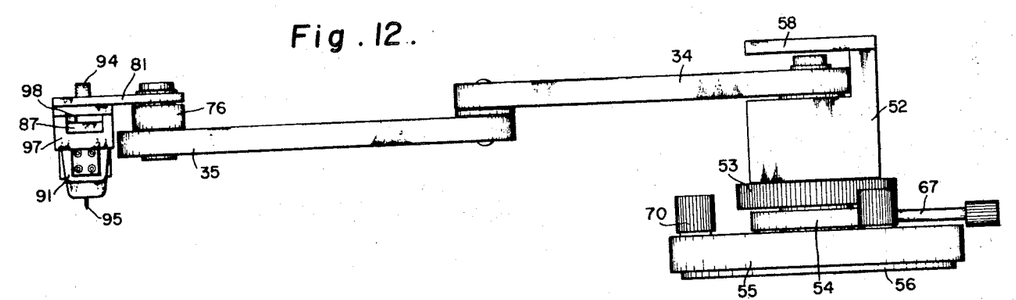
FIG. 12 is a side view of the pickup shown in FIG. 11.
Figure 13:
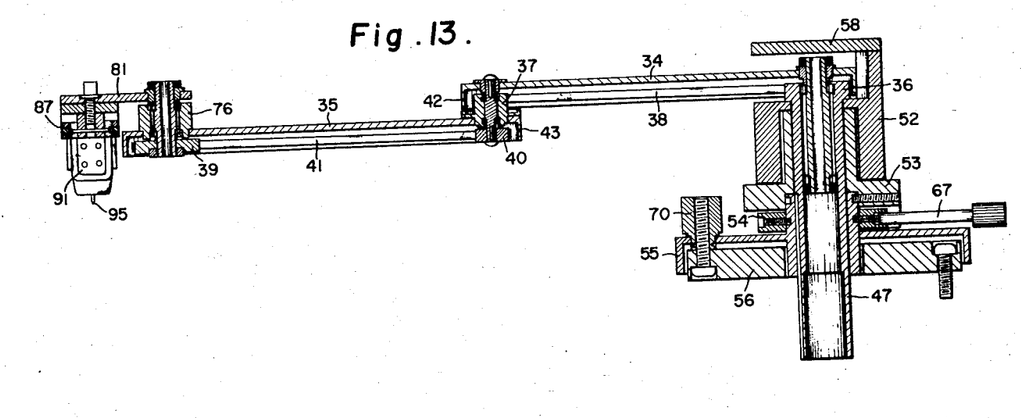
FIG. 13 is a vertical section taken along the line D—D of FIG. 11.

In FIGS. 11 through 17 is shown another embodiment of the pickup according to the invention which incorporates a number of effective auxiliary means. FIGS. 11, 12 and 13 illustrate the general construction of the pickup. The pickup includes an orienting device permitting rotation of the support which serves to make the stylus move along a straight line leading to the center of the turntable, a horizontal stabilizing device for axially adjusting the support to keep the arm in a horizontal position to thereby facilitate the movement of the stylus and to prevent generation of inside force with respect to the sound grooves, and an easier-to-handle cartridge mounting device, each of which will be described later in considerable detail. Further, the various parts of the present embodiment are considerably standardized and designed for easy assembly.

The pickup is provided with two identically formed links 34 and 35. The link 34 has a pair of pulleys 36 and 37 associated therewith which are wrapped around by a tapelike body 38. The link 35 is fixed to the pulley 37 and has a pair of pulleys 39 and 40 associated therewith, the pulley 40 being fixed to the link 34, and a tapelike body 41 is disposed around the pair of pulleys. Both pairs of pulleys described above have the diameter ratio of 2 to 1 and in both cases the pulleys are spaced equidistantly apart. The links 34 and 35 have planar dimensions large enough to cover the paired pulleys, have flange-like, vertical walls 42 and 43, and are formed to constitute channel-like cross-section. The vertical walls 42 and 43 serve to increase the rigidity of the links 34 and 35.

Figure 14:
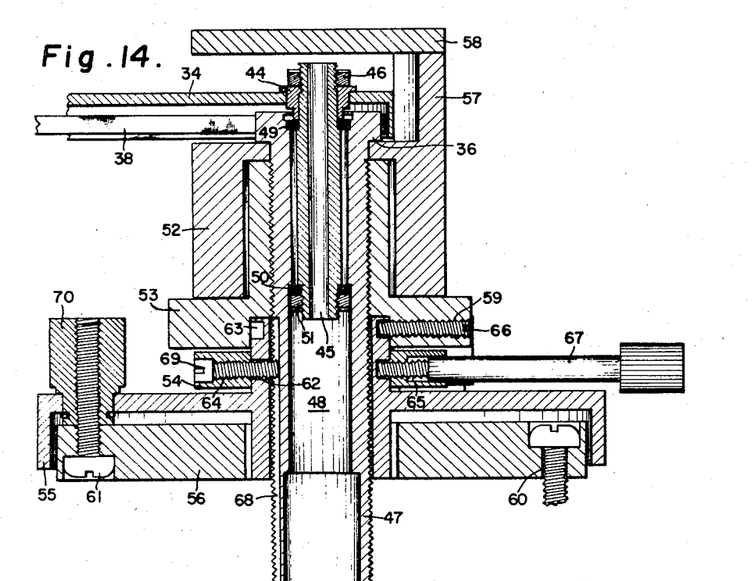
FIG. 14 is an enlarged vertical section of the mount shown in FIG. 13.

FIG. 14 is an enlarged vertical sectional view of the mount portion for illustrating the details thereof. The link 34 carries a pivot 45 by way of a bush 44, a nut 46 engaging the thread at the top of the pivot, which is thus made integral with the link. The pivot 45 extends through the pulley 36 and an axial bore 48 of a support 47 having substantial length, the support 47 extending downwardly from the pulley. Bearing 49 and 50 are retained within the bore 48 to support the pivot 45 in such a way that it forms a turning pair with the pulley 36. If necessary, a nut 51 may be disposed at the lower end of the pivot 45 to secure the bearing 50. The mount for attaching the support 47 to the transducer system consists of a bracket 52, an adjusting ring 53, a collar 54, an adjustable base 55 and a fixed base 56. The bracket 52 has a short flange extending inwardly from its top and is shaped to have a rectangular cross-section. The short flange forms an opening of such diameter that the support 47 easily fits thereinto. With a view to protecting the rear end of the link 34, the bracket is provided with an upwardly extending wall 57. In order to protect the upper portion of the pivot 45 a plate 58 is fixed to the top of the wall 57. The plate may be used as a name plate. The adjusting ring 53 consists of a cylindrical portion which fits upwardly into the gap between the bracket 52 and the support 47 to thereby threadedly engage the latter, and an outwardly protruding flange portion on which the lower end of the bracket 52 rests. The adjusting ring is thus screwed onto the support 47 and supports the bracket 52. The adjusting ring 53 has an annular recess at its lower end and around the support for receiving the top portion of the adjustable ring 55. A suitable number of tapped holes are provided in such a manner that they extend from the outer periphery of the flangelike portion to the above recess.

The fixed base is circular in shape and is fixed to the plate (not shown) of the transducer system with wood screws inserted through a suitable number of fitting holes 60 disposed equiangularly adjacent the periphery of the fixed base. At least three upwardly protruding bolts 61 are inserted from the bottom of the fixed base. The fixed base is provided with a central opening for receiving the adjustable base.

The adjustable base 55 comprises an outwardly extending flangelike portion having an annular plane, and cylindrical portions extending upwardly and downwardly, respectively, from the flangelike portion. The flangelike portion is so disposed that it lies over the surface of the fixed base 56 with a suitable gap left therebetween for the purpose to be described later. The upper cylindrical portion is provided at different levels with two annular grooves 62 and 63, a part of the groove 62 being cut open.

The adjustable base 55 fits, with its upper cylindrical portion, into the recess provided at the lower end of the adjusting ring 53, and receives the support 47 within its cylindrical portions.

A collar 54 having an annular shape fits around the outer periphery of the upper cylindrical portion of the adjustable base 55 and has a pair of threaded bores 64 and 65 provided therethrough which extend diametrically of the collar. A bolt 69 engages with the threaded bore 64 and extends therethrough to pass through the annular groove 62 of the adjustable base 55 at the aforementioned cut-through part, the inward end of the bolt finally engaging with a longitudinal groove 68 provided at the outer periphery of the support 47. The arrangement is such that the engagement between the inward end of the bolt 69 and the longitudinal groove 68 serves to constrain the rotation of the support 47 to about its axis, but to permit the support 47 to move freely in the vertical direction. In order to allow the rotation of the collar 54 with respect to the upper cylindrical portion of the adjustable base 55, a handle 67 is threaded into the bore 65, with the inward end thereof being guided in the annular groove 62. It will be appreciated that because of the engagement between the inward end of the bolt 69 and the longitudinal groove 68, turning the handle 67 about the axis of the support 47 causes rotation of the latter while its vertical motion is held, thereby serving as an orienting device for the stylus so that it can move on an imaginary straight line leading to the center of the turntable.

The suitable number of threaded holes 59 provided in the adjusting ring 53 extend towards and vertically aligned with the annular groove 63 of the adjustable base 55. Bolts 66 are screwed into the threaded holes 59 and engage with the annular groove 63 at their inner ends. The bolts 66 have a diameter substantially to the width of the annular groove 63 and the arrangement is such that although the bolts 66 are free to move within the annular groove 63 in the circumferential direction, the bolts are blocked in their vertical movement by the groove 63. Thus it will be seen that turning the adjusting ring 53 raises or lowers the support 47 on account of the threaded engagement between the outer periphery of the support and the inner periphery of the adjusting ring 53. Once the desired vertical position of the support 47 is reached, the ring 53 may be locked in such position by any suitable means.

At least three adjusting nuts 70 are attached to the bolts 61 protruding from the flangelike portion of the adjustable base 55 so as to change the gap between the fixed base 56 and the adjustable base 55. The adjustable base 55 is used as a horizontal orienting device for the arm for compensating the inclination of the support 47 and thereby inducing the stylus to function smoothly, by either tightening or loosening one of the adjusting nuts 70.

Figure 15:
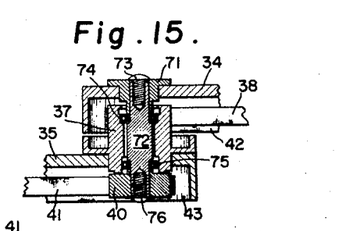
FIG. 15 is an enlarged, partial view of FIG. 13, showing the connection of the two links in detail.

In FIG. 15, the coupling portion of the links 34 and 35 are shown in considerable detail. The link 34 integrally supports the coupling shaft 72 fitted into a bushing 71 by means of a bolt 73. The pulley 37 fixed to the link 35 fits over the coupling shaft 72. Two bearings 74 and 75 are retained within the pulley 37 to support the coupling shaft 37 so that the latter form a turning pair with the link 34. The pulley 40 is fitted around the coupling shaft 72 and is secured integrally with the latter by means of a bolt 76; in other words, the link 35 and the pulley 40 constitute a turning pair. The pulleys 37 and 40 are hidden from view by the vertical walls 42 and 43 of the two links.

Figure 16:
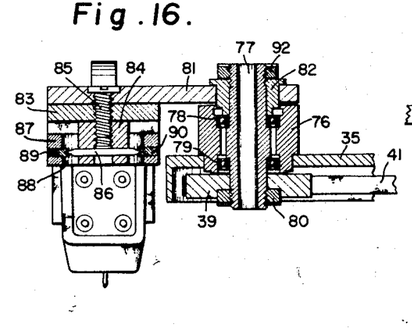
FIG. 16 is a partly enlarged vertical section of the free end of the arm shown in FIG. 13.

FIG. 16 shows the free end of the link 35 in vertical section.

The link 35 carries an upwardly extending bearing support 76 which holds bearings 78 and 79 for a pivot 77. The pulley 39 is fixed to the lower end of the pivot 77 by means of a nut 80 and substantially forms a turning pair with the link 35. An elongated bracket 81 is integrally fixed to the upper end of the pivot 77 by way of a bush 82 and a nut 92. A plate 83 and a downwardly oriented pivot base 84 are fixed to the outwardly protruding end of the bracket 81 by a single common bolt 85. A pivot 86 extends through the pivot base 84 in parallel relationship to the length of the bracket 81, both ends thereof protruding from the pivot base.

The pivot 86 is disposed so that it faces the holes 88 of a lever 87 and a pair of pivot receivers 89 are screwed into the holes 88 from both sides to engage with each end of the pivot 86, which therefore functions as the lever's fulcrum.

FIG. 17 shows a vertical sectional view taken along the line E—E of FIG. 11, or a vertical sectional view taken at an imaginary line running through the center of the lever as shown in FIG. 16 and illustrates the details of the lever 87. The lever 87 is an elongated, flat strip extending in a direction prependicular to the length of the bracket 81 and is rotatable about the pivot 86. The cartridge generally represented by the numeral 91 is fixed to one end of the lever 87 by means of bolts (not shown). In this case, holes provided in the lever to receive the bolts are comparatively long in the longitudinal direction of the lever, thereby enabling to adjust the fitting position of the cartridge 91. A plate 93 is fixed to the lever 87 at said one end and has a curved portion 84 to be engaged by finger to lift the lever.

The stylus 95 is attached to the tip of a cantilever 96 protruding from the cartridge 91 in the same direction as the lever 87. A weight 97 is provided on the other end of the lever 87 to maintain adequate pressure and balance at the stylus 95. The weight 97 is provided with several kinds of auxiliary weights to facilitate the balance. A groove 100 is disposed within the lever 87 so that the weights may be shifted in the longitudinal direction of the lever, as by moving a bolt 99 which carries the weights.

The embodiment shown in FIGS. 11 to 17 may be made, for the most parts, from light metals such as aluminium, so that its total mass of the moving system may be reduced one-third to one-fifth that of conventional pickups.

The pickup according to the present invention has a number of features, which will find various effective applications, particularly in the reproduction of sound from stereophonic records.

While the invention has been described and illustrated with reference to particular embodiments, these should not be construed as limiting the invention. It should be apparent to those skilled in the art that various modifications are possible without departing from the spirit of the invention.

What is claimed is:

1. A pickup arm comprising first and second links pivotally connected to each other adjacent one end portion of each of said links, said adjacent end portions of said first and second links being coaxially disposed with one end portion underlying the oher, the opposite end portion of said first link being supported for movement about a fixed point and the opposite end portion of the second link carrying a phonograph cartridge, two pairs of motion transmitting means being provided with one pair disposed at opposite end portions of said first link and the other pair being disposed at opposite end portions of said second link, the adjacent end portions of said first and second links being pivotally interconnected by one of the motion transmitting means respectively associated with said first and second links, a mount, and a support adjustably carried by said mount, the motion transmitting means at that end portion of said first link which is moved about said fixed point being mounted on said adjustable support, the latter serving as a sole support for said first and second links, the motion transmitting means at the end portion of said first and second links opposite said pivotally connected adjacent end portions of said links being rotatable members of larger diameter than the rotatable members affording said pivotal connection between the adjacent end portions of said links.

2. A pickup arm according to claim 1, wherein said first and second links are substantially the same length.

3. A pickup arm according to claim 1, wherein said motion transmitting means comprise interconnected pulleys the pulleys at the end portions of said first and second links opposite said pivotally connected adjacent end portions of said links having a 2:1 ratio relative to the pulleys affording said pivotal connection between the adjacent end portions of said links.

4. A pickup arm according to claim 1, wherein said motion transmitting means comprise intermeshed gears, the gears at the end portions of said first and second links opposite said pivotally connected adjacent end portions of said links having a gear ratio of 2:1 relative to the gears affording said pivoted connection between the adjacent end portions of said links.

5. A pickup arm according to claim 1, wherein said motion transmitting means comprise interengageable friction wheels, the wheels at the end portions of said first and second links opposite said pivotally connected adjacent end portions of said links having a ratio of 2:1 relative to the wheels affording said pivoted connection between the adjacent end portions of said links.

6. A pickup arm according to claim 1, wherein said support extends from said motion transmitting means in a direction to provide a space below said motion transmitting means.

7. A pickup arm according to claim 1, wherein said first and second links are superposed when in a stored position.

8. A pickup arm according to claim 1, comprising a lever-carried by the second link at said opposite end portion thereof and being supported for pivotal movement in a direction perpendicular to the plane of movement of said second link, said lever carrying said cartridge at one free end portion thereof.

References Cited

UNITED STATES PATENTS

| | | | |
|---|---|---|---|
| 855,761 | 6/1907 | Elfering | 274—23.1 |
| 2,832,661 | 4/1958 | Wiley | 74—52 X |
| 3,051,493 | 8/1962 | Dreier | 274—23 |
| 3,221,419 | 12/1965 | Cohen | 74—52 X |
| 2,316,485 | 4/1943 | Langsner | 33—79.3 |
| 2,977,126 | 3/1961 | Chalfin | 274—23.1 |

HARRY N. HAROIAN, *Primary Examiner.*